(12) United States Patent
Matsuzaki (10) Patent No.: US 10,322,630 B2
(45) Date of Patent: Jun. 18, 2019

(54) FUEL TANK

(71) Applicant: YACHIYO INDUSTRY CO., LTD., Saitama (JP)

(72) Inventor: Toru Matsuzaki, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 15/569,823

(22) PCT Filed: Mar. 9, 2016

(86) PCT No.: PCT/JP2016/057308
§ 371 (c)(1),
(2) Date: Oct. 27, 2017

(87) PCT Pub. No.: WO2016/174936
PCT Pub. Date: Nov. 3, 2016

(65) Prior Publication Data
US 2018/0134150 A1  May 17, 2018

(30) Foreign Application Priority Data

Apr. 27, 2015 (JP) .................................. 2015-090204

(51) Int. Cl.
*B60K 15/03* (2006.01)
*B29C 49/04* (2006.01)
(Continued)

(52) U.S. Cl.
CPC ........ *B60K 15/03177* (2013.01); *B29C 49/04* (2013.01); *B29C 49/20* (2013.01);
(Continued)

(58) Field of Classification Search
CPC ............ B60K 15/03177; B60K 15/073; B60K 15/03; F17C 2203/012; F17C 2203/013; F17C 1/08
(Continued)

(56) References Cited

U.S. PATENT DOCUMENTS

| 2,724,418 A | * | 11/1955 | Krupp | ................... B64D 37/06 |
| | | | | 220/565 |
| 3,596,794 A | * | 8/1971 | Peters | .................. B62D 29/048 |
| | | | | 220/646 |

(Continued)

FOREIGN PATENT DOCUMENTS

| CN | 102149559 B | 8/2014 |
| DE | 10 2009039888 A1 | 3/2011 |

(Continued)

OTHER PUBLICATIONS

Office Action from corresponding Chinese application dated Apr. 2, 2018, by Chinese Patent Office (6 pages).
(Continued)

*Primary Examiner* — Robert Poon
(74) *Attorney, Agent, or Firm* — Capitol City TechLaw, PLLC; Samuel P. Burkholder (57) ABSTRACT

Provided is a fuel tank which allows effective suppression of the deformation of a fuel tank body and has excellent durability. This fuel tank is equipped with: a fuel tank body; connecting members which partially connect the opposed inner wall surfaces of the fuel tank body to each other, and/or abutment portions where the opposed inner wall surfaces of the fuel tank body partially abut on each other; and reinforcing members which are provided integrally with the outer wall surfaces of the fuel tank body and reinforce the outer wall surfaces. The fuel tank is configured such that the reinforcing members are equipped with: base portions which are disposed at positions corresponding to the con- (Continued)

necting members and/or the abutment portions; and extension portions which extend along the outer wall surfaces from the base portions.

7 Claims, 6 Drawing Sheets

(51) Int. Cl.
  *B29C 49/20* (2006.01)
  *B29C 49/48* (2006.01)
  *B29C 51/02* (2006.01)
  *B29C 51/12* (2006.01)
  *B29C 51/30* (2006.01)
  *F02M 37/00* (2006.01)
  *B29L 31/00* (2006.01)

(52) U.S. Cl.
  CPC ............. *B29C 49/48* (2013.01); *B29C 51/02* (2013.01); *B29C 51/12* (2013.01); *B29C 51/30* (2013.01); *B60K 15/03* (2013.01); *F02M 37/00* (2013.01); *B29C 2049/2013* (2013.01); *B29L 2031/7172* (2013.01); *B60K 2015/03032* (2013.01); *B60K 2015/03493* (2013.01)

(58) Field of Classification Search
  USPC ........ 220/562, 592, 645, 651, 646, 652–653
  See application file for complete search history.

(56) References Cited

U.S. PATENT DOCUMENTS

| | | | | |
|---|---|---|---|---|
| 4,193,510 | A * | 3/1980 | Weston | B65D 90/025 |
| | | | | 220/4.13 |
| 4,453,564 | A | 6/1984 | Bergesio | |
| 6,294,127 | B1 | 9/2001 | Huse | |
| 6,338,420 | B1 * | 1/2002 | Pachciarz | B60K 15/03177 |
| | | | | 220/4.13 |
| 6,802,430 | B2 * | 10/2004 | Tomimura | B60K 15/03 |
| | | | | 220/4.14 |
| 8,186,292 | B2 * | 5/2012 | Yoo | F17C 3/00 |
| | | | | 114/74 A |
| 8,490,807 | B2 * | 7/2013 | Varga | B60K 15/03177 |
| | | | | 220/4.14 |
| 8,919,599 | B2 * | 12/2014 | Menke | B60K 15/03 |
| | | | | 220/562 |
| 9,579,972 | B2 | 2/2017 | Taniguchi et al. | |
| 9,764,635 | B2 * | 9/2017 | Kataoka | B60K 15/03177 |
| 9,919,595 | B2 * | 3/2018 | Diestelhorst | B29C 48/0017 |
| 9,937,788 | B1 * | 4/2018 | Tsukahara | B60K 15/03 |
| 2001/0019061 | A1 * | 9/2001 | Ettlinger | F17C 1/08 |
| | | | | 220/651 |
| 2005/0011891 | A1 * | 1/2005 | Austerhoff | B60K 15/03006 |
| | | | | 220/4.12 |
| 2006/0151505 | A1 * | 7/2006 | Kobayashi | B29C 45/14262 |
| | | | | 220/562 |
| 2007/0228050 | A1 * | 10/2007 | Isoda | B60K 15/03 |
| | | | | 220/562 |
| 2011/0127761 | A1 | 6/2011 | Yoshizawa et al. | |
| 2012/0325822 | A1 * | 12/2012 | Pozgainer | B60K 15/03177 |
| | | | | 220/562 |
| 2013/0048646 | A1 * | 2/2013 | Kataoka | F16J 12/00 |
| | | | | 220/581 |
| 2014/0166664 | A1 * | 6/2014 | Lin | B60K 15/03006 |
| | | | | 220/562 |
| 2015/0090727 | A1 * | 4/2015 | Kataoka | F16J 12/00 |
| | | | | 220/592 |
| 2015/0367726 | A1 | 12/2015 | Taniguchi | |
| 2016/0193913 | A1 * | 7/2016 | Kataoka | B60K 15/03177 |
| | | | | 220/562 |

FOREIGN PATENT DOCUMENTS

| | | |
|---|---|---|
| EP | 2711225 A1 | 3/2014 |
| JP | 63-258750 A | 10/1988 |
| JP | 2009-166753 A | 7/2009 |
| JP | 2014-148227 A | 8/2014 |

OTHER PUBLICATIONS

International Search Report from PCT/JP2016/057308 dated May 31, 2016, by Japan Patent Office (2 pages).
International Preliminary Report on Patentability from PCT/JP2016/057308 dated Aug. 15, 2017, by Japan Patent Office (4 pages).
Extended European Search Report from corresponding European application dated Jul. 31, 2018, by European Patent Office (7 pages).

* cited by examiner

FUEL TANK

CROSS-REFERENCE TO RELATED APPLICATION

This application is a U.S. National Stage Application under 35 U.S.C § 371 of International Patent Application No. PCT/JP2016/057308 filed Mar. 9, 2016, which claims the benefit of priority to Japanese Patent Application No. 2015-090204 filed 27 Apr. 2015, the disclosures of all of which are hereby incorporated by reference in their entities.

TECHNICAL FIELD

The present invention relates to a fuel tank.

BACKGROUND ART

As a fuel tank mounted on an automobile, one described in Patent Document 1 is known. Patent Document 1 describes the fuel tank in which a frame member is provided on an outer peripheral surface of a resin fuel tank body. With this fuel tank, it is possible to reinforce the fuel tank by the frame member.

CITATION LIST

Patent Literature

[Patent Document 1]
German Patent Application Publication No. DE102009039888A1

SUMMARY OF INVENTION

Technical Problem

The fuel tank undergoes positive pressure deformation or negative pressure deformation by internal pressure changes caused by, for example, outside air temperature changes or temperature changes due to heat of an exhaust system. Especially in case of a resin fuel tank, it is susceptible to such external factors. In the fuel tank of Patent Document 1, although positive pressure deformation of the fuel tank body can be suppressed by the frame member, there has been a problem that negative pressure deformation cannot be dealt with. When the fuel tank body undergoes negative pressure deformation, there is a problem that a valve, a pump and the like arranged inside the fuel tank body are adversely affected. Further, in the fuel tank of Patent Document 1, since the frame member entirely surrounds the fuel tank body from a periphery thereof, the frame member is large, and it is hard to say that deformation of the fuel tank body is effectively suppressed.

The present invention has been made in order to solve the above problems, and an object of the present invention is to provide a fuel tank capable of increasing rigidity of the fuel tank body and effectively suppressing deformation of the fuel tank body.

Solution to Problem

In order to solve the above problems, a fuel tank according to an aspect of the present invention includes a resin fuel tank body, a connecting member for partially connecting opposed inner wall surfaces of the fuel tank body and/or an abutment portion where opposed inner wall surfaces of the fuel tank body partially abut each other, and a reinforcing member integrally provided on an outer wall surface of the fuel tank body by insert molding from outside of the fuel tank body and reinforcing the outer wall surface, wherein the reinforcing member includes a base portion disposed at a position corresponding to the connecting member and/or the abutment portion, and an extending portion extending along the outer wall surface from the base portion, so as to suppress positive pressure deformation and negative pressure deformation of the fuel tank body.

According to the aspect of the present invention, since the opposed inner wall surfaces are partially connected to each other by the connecting member and/or since the opposed inner wall surfaces partially abut each other in the abutment portion, rigidity of the fuel tank body can be increased. Further, the base portion of the reinforcing member is disposed outside of the abutment portion and/or the connecting member, and the reinforcing member includes the extending portion extending from the base portion. Thus, it is possible to effectively reinforce a portion where stress is applied during positive pressure deformation or negative pressure deformation, thereby further increasing the rigidity of the fuel tank body. Therefore, regardless of positive pressure deformation or negative pressure deformation of the fuel tank body, deformation of the fuel tank body can be effectively suppressed.

It is preferred that the connecting members and/or the abutment portions are arranged in plurality, the base portions are arranged in plurality corresponding to the connecting members and/or the abutment portions, and at least two of the base portions are connected to each other via the extending portion.

With such a structure, since the rigidity of the fuel tank body can be increased as compared with a case where the connecting member and/or the abutment portion and the base portion corresponding thereto are arranged one by one, deformation of the fuel tank body can be further suppressed. In addition, since at least two of the base portions are connected to each other via the extending portion, deformation between the base portions can be suitably suppressed by the extending portion.

The extending portion preferably includes a projecting portion projecting inwardly of the fuel tank body. With such a structure, since the inner wall surface of the fuel tank body projects inwardly of the fuel tank body, it is possible to obtain a function of cancelling wave of fuel. In addition, rigidity of the reinforcing member itself is also increased.

It is preferred that the outer wall surface of the fuel tank body is provided with a cushioning member, and the extending portion extends to a position corresponding to the cushioning member.

With such a structure, since rigidity around the cushioning member which is easily subjected to external forces can be increased, deformation of the fuel tank body can be more effectively suppressed.

The reinforcing members are preferably arranged in pairs on the outer wall surfaces facing each other of the fuel tank body. With such a structure, the rigidity of the fuel tank body can be increased in a well-balanced manner.

Advantageous Effects of Invention

According to the fuel tank of the present invention, it is possible to effectively suppress deformation of the fuel tank body.

DESCRIPTION OF EMBODIMENTS

Figure 1:
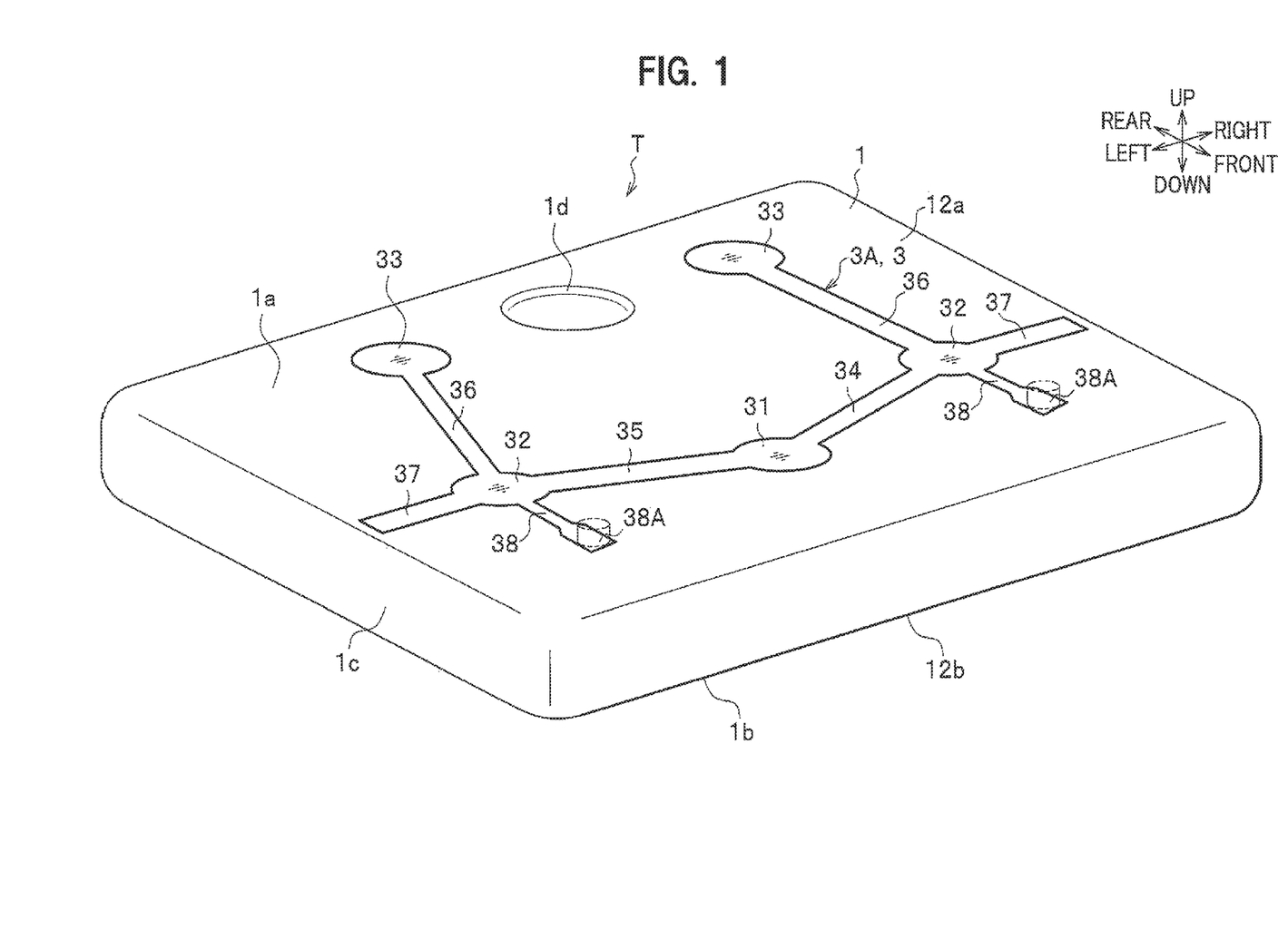
FIG. 1 is a perspective view showing a fuel tank according to an embodiment of the present invention.
Figure 2:
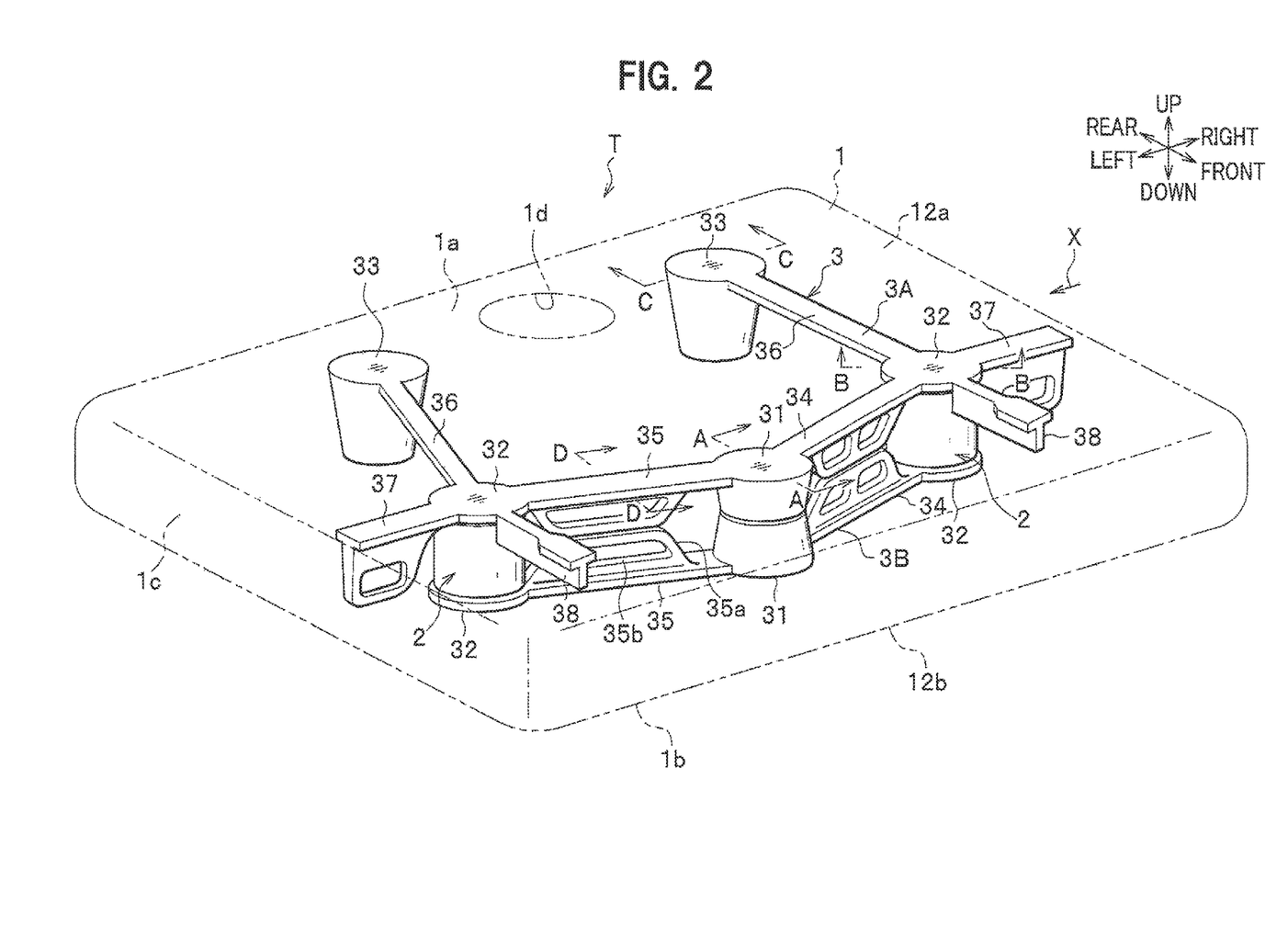
FIG. 2 is a transparent perspective view showing an interior of the fuel tank according to the embodiment of the present invention.
Figure 3:
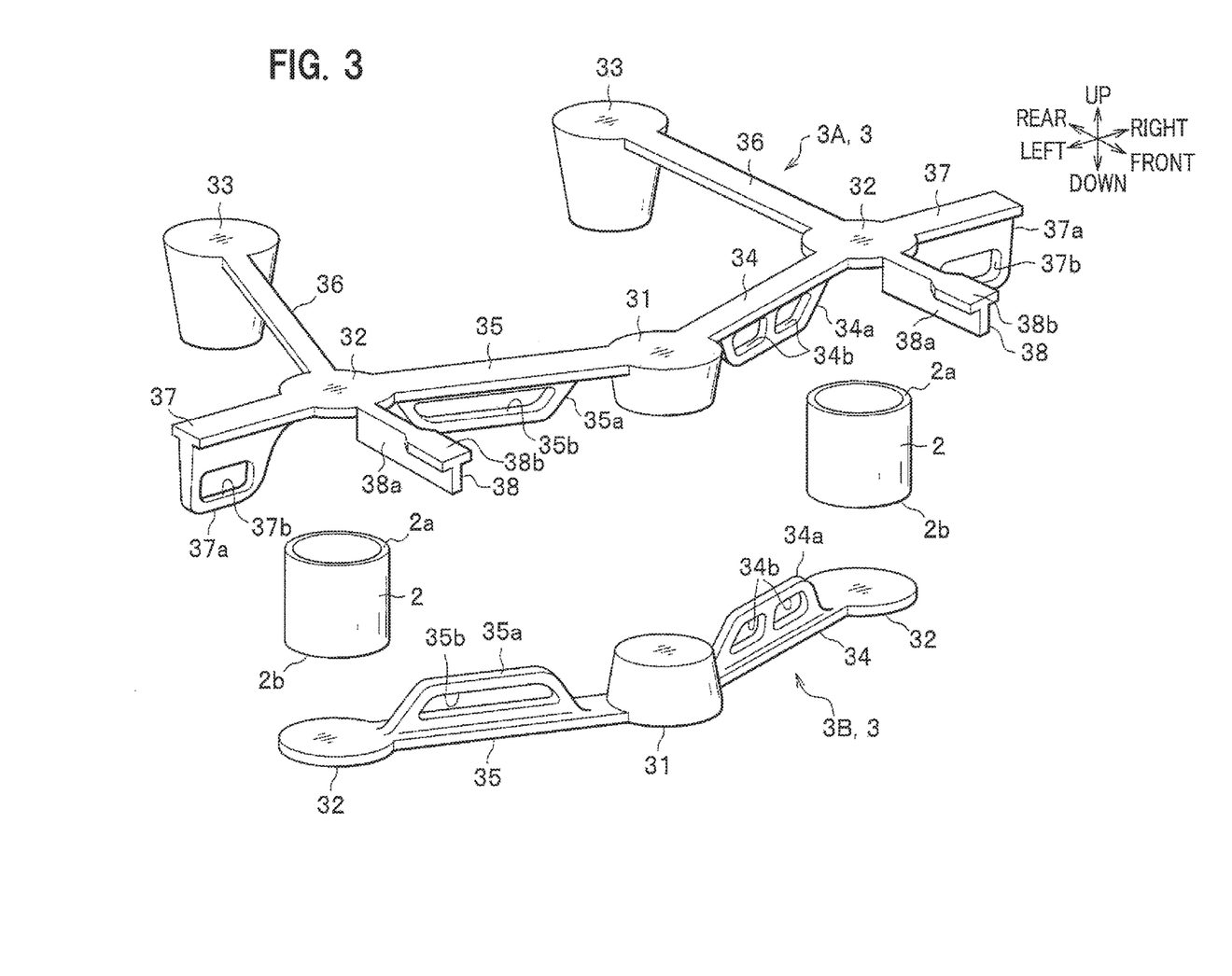
FIG. 3 is an exploded perspective view showing a correspondence relationship between a connecting member and a pair of upper and lower reinforcing members.

Hereinafter, embodiments of the present invention will be described with reference to the drawings. In the following description, when referring to "front and rear", "left and right", and "up and down", directions shown in FIGS. 1 to 3 are used as a reference. The directions are set for convenience in describing a fuel tank T and are not intended to limit directions when the fuel tank T is mounted on the vehicle.

The fuel tank T shown in FIGS. 1, 2 is to be mounted on transport means such as an automobile, a motorcycle or a ship, and includes a fuel tank body 1, a connecting member 2 (see FIG. 2) disposed inside the fuel tank body 1, and a reinforcing member 3 disposed outside the fuel tank body 1.

The fuel tank body 1 is a hollow container for storing fuel such as gasoline and is formed of, for example, a thermoplastic resin including a barrier layer. The fuel tank body 1 is manufactured by blow molding or the like. As shown in FIG. 1, the fuel tank body 1 includes an upper wall portion 1a, a lower wall portion 1b, and a side wall portion 1c connecting the upper wall portion 1a and the lower wall portion 1b. The fuel tank body 1 is wide and has a thin shape in an up-down direction. A pump mounting hole 1d is formed through the upper wall portion 1a of the fuel tank body 1. The pump mounting hole 1d is mounted with a pump (not shown) for pumping the fuel out of the tank.

As shown in FIG. 1, cushioning members 38A, 38A are arranged on an outer wall surface 12a of the upper wall portion 1a of the fuel tank body 1. The cushioning members 38A, 38A have, for example, a columnar shape, and are members interposed between the fuel tank T and a vehicle body (not shown). The cushioning member 38A is formed of, for example, a material such as rubber capable of absorbing impact.

The connecting member 2 is a member attached to an inside of the fuel tank body 1 when manufacturing the fuel tank body 1, and is formed of, for example, a thermoplastic resin. As shown in FIG. 4B, the connecting member 2 has a cylindrical shape, and includes an upper end portion 2a welded to an inner wall surface 11a of the upper wall portion 1a and a lower end portion 2b welded to an inner wall surface 11b of the lower wall portion 1b. The connecting member 2 is a reinforcing member for partially connecting the opposed inner wall surfaces 11a, 11b. As shown in FIG. 2, in the present embodiment, two connecting members 2 are arranged inside the fuel tank body 1 with a space therebetween.

As shown in FIGS. 2 and 3, the reinforcing member 3 is a member which is inserted from outside of the fuel tank body 1 and attached thereto when manufacturing the fuel tank body 1. It is preferred that the reinforcing member 3 is lightweight and is a member capable of increasing rigidity of the fuel tank body 1. In the present embodiment, the reinforcing member 3 is formed of an aluminum alloy. The reinforcing member 3 may be formed by welding, but in the present embodiment, it is integrally formed by die casting.

The reinforcing members 3 are arranged in pairs on the upper wall portion 1a and the lower wall portion 1b which are opposed to each other. An upper reinforcing member 3A has a shape along the outer wall surface 12a of the upper wall portion 1a, and a lower reinforcing member 3B has a shape along an outer wall surface 12b of the lower wall portion 1b. Since the reinforcing member 3A and the reinforcing member 3B have common portions, the upper reinforcing member 3A will be described below with reference to FIG. 3 and the like, and then the lower reinforcing member 3B will be described.

The reinforcing member 3A includes a first base portion 31, a second base portion 32 and a third base portion 33 which are different in shape from each other, and extending portions 34 to 38 extending along the outer wall surface 12a. The first base portion 31 is disposed at a substantially central portion in a left-right direction on a front side of the fuel tank body 1 (see FIGS. 1, 2). The first base portion 31 has a substantially truncated cone shape reduced in diameter downward. The extending portion 34 extending rightward and the extending portion 35 extending leftward are connected to the first base portion 31.

Figure 4A:
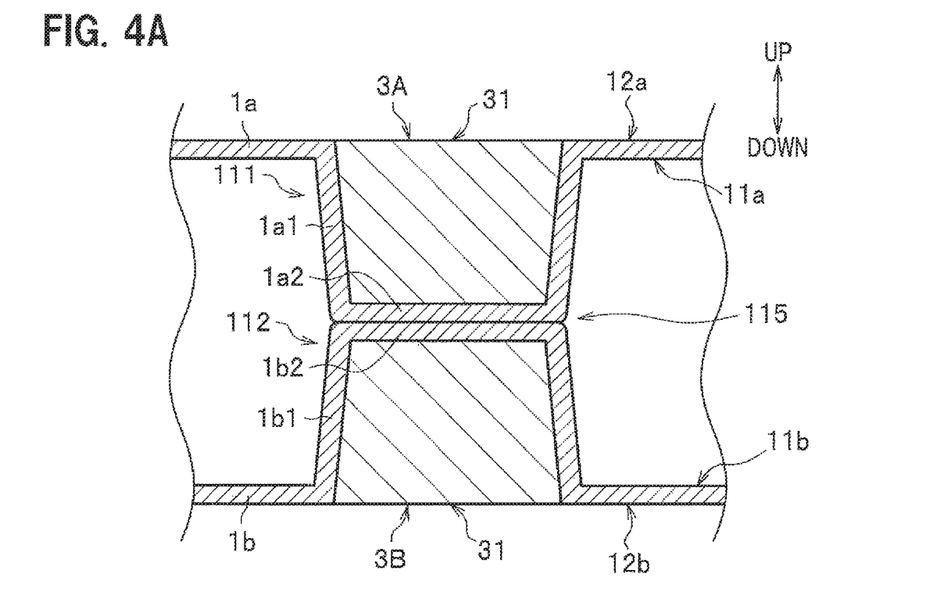
FIG. 4A is a cross-sectional view taken along a line A-A in FIG. 2.
Figure 4B:
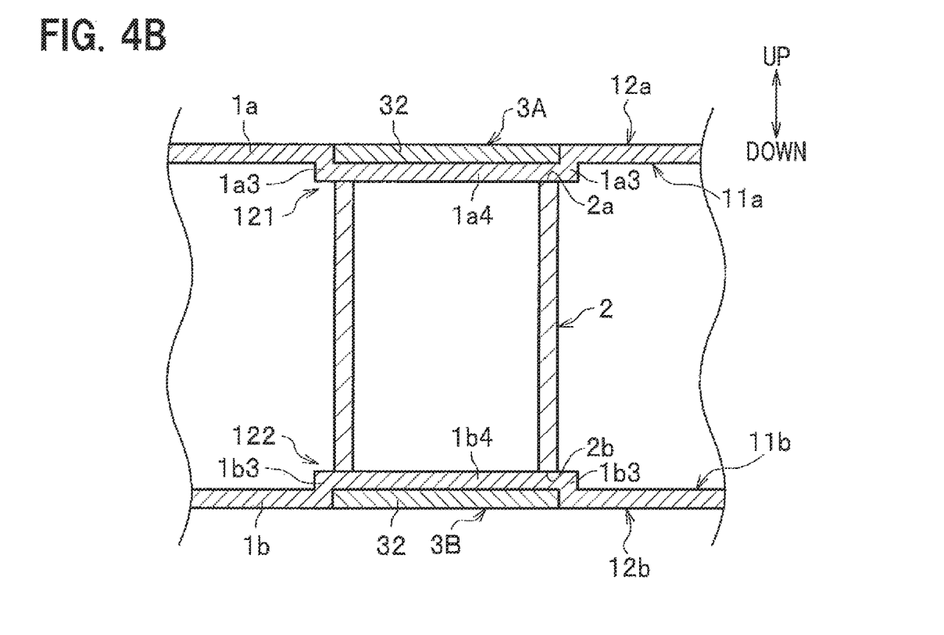
FIG. 4B is a cross-sectional view taken along a line B-B in FIG. 2.

As shown in FIG. 4A, the first base portion 31 of the reinforcing member 3A is integrated with a first projecting portion 111 projecting inwardly of the upper wall portion 1a. Since the first base portion 31 and the first projecting portion 111 are integrated together, a peripheral wall portion 1a1 and a bottom portion 1a2 of the first projecting portion 111 have a shape along a shape of the first base portion 31.

The second base portion 32 of the reinforcing member 3A has a circular flat plate shape. The second base portions 32 are arranged one by one on a left side and a right side of the first base portion 31, which positions correspond to the connecting members 2, 2. The second base portion 32 on the left side is connected to the first base portion 31 via the extending portion 35. To the second base portion 32 on the left side, an extending portion 36 extending rearwardly, an extending portion 37 extending leftwardly, and an extending portion 38 extending forwardly are connected. The second base portion 32 on the right side is connected to the first base portion 31 via the extending portion 34. Similarly to the second base portion 32 on the left side, to the second base portion 32 on the right side, an extending portion 36 extending rearwardly, an extending portion 37 extending rightwardly, and an extending portion 38 extending forwardly are connected.

As shown in FIG. 4B, the second base portion 32 of the reinforcing member 3A is integrated with a second projecting portion 121 projecting inwardly of the upper wall portion 1a. Since the second base portion 32 and the second projecting portion 121 are integrated together, a step portion 1a3 and a bottom portion 1a4 of the second projecting portion 121 have a concave shape along a shape of the second base portion 32. The upper end portion 2a of the connecting member 2 is welded to a lower surface (the inner wall surface 11a of the upper wall portion 1a) of the bottom portion 1a4 of the second projecting portion 121.

As shown in FIG. 2, the third base portions 33 are arranged one by one on the left side and the right side on a rear side of the fuel tank body 1. The third base portion 33 has a substantially truncated cone shape reduced in diameter downward. The third base portion 33 on the left side is connected to the second base portion 32 on the left side via the extending portion 36. The third base portion 33 on the right side is connected to the second base portion 32 on the right side via the extending portion 36.

Figure 5A:
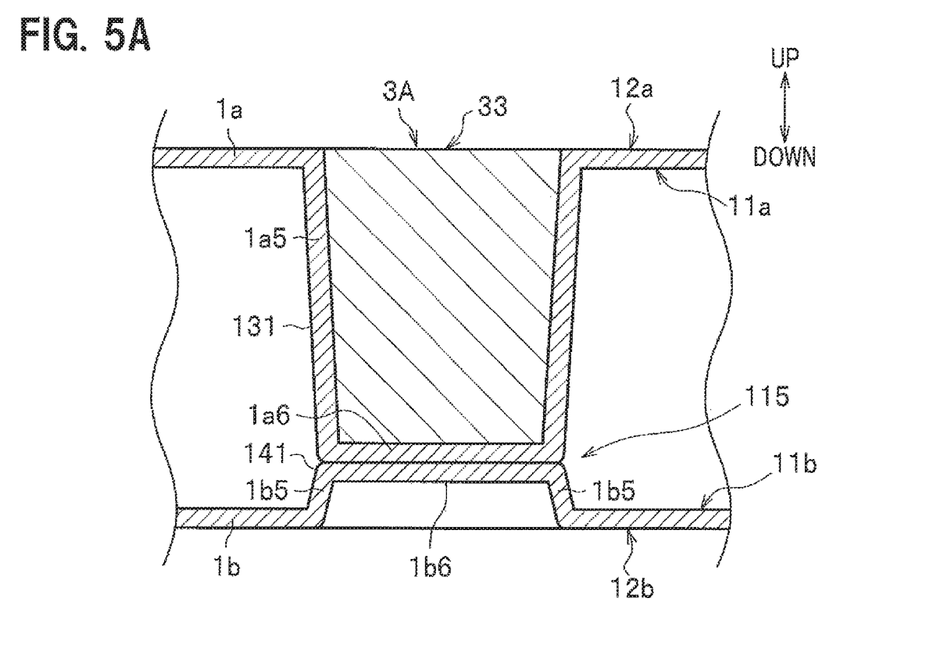
FIG. 5A is a cross-sectional view taken along a line C-C in FIG. 2.

As shown in FIG. 5A, the third base portion 33 is integrated with a third projecting portion 131 projecting inwardly of the upper wall portion 1a. Since the third base portion 33 and the third projecting portion 131 are integrated together, a peripheral wall portion 1a5 and a bottom portion 1a6 of the third projecting portion 131 have a shape along a shape of the third base portion 33. The third projecting portion 131 faces a fourth projecting portion 141 projecting inwardly of the lower wall portion 1b. The fourth projecting portion 141 includes a step portion 1b5 and a bottom portion 1b6. A lower surface of the bottom portion 1ab of the third projecting portion 131 abuts and is welded to an upper surface of the bottom portion 1b6 of the fourth projecting portion 141.

Figure 5B:
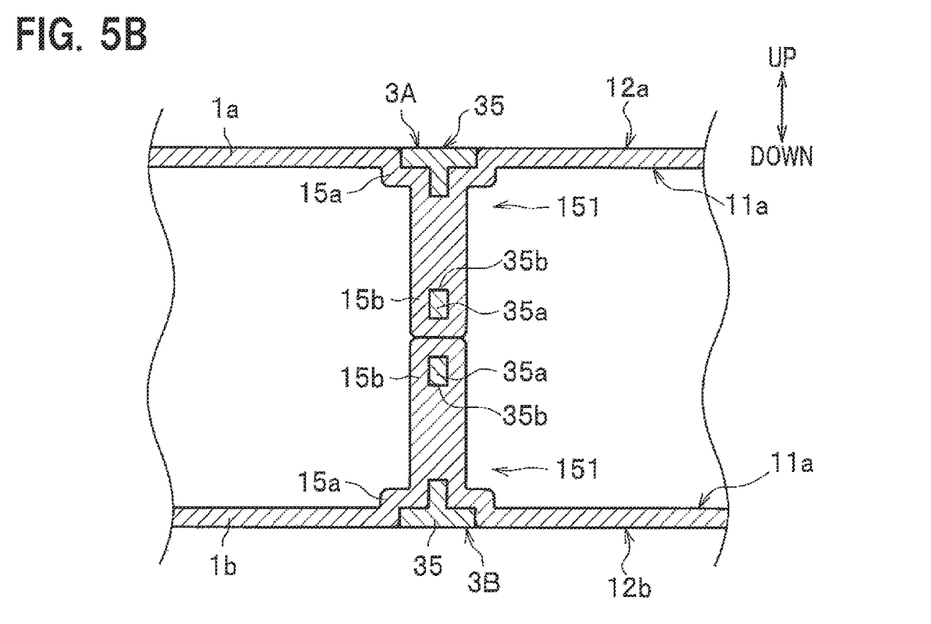
FIG. 5B is a cross-sectional view taken along a line D-D in FIG. 2.

As shown in FIGS. 2, 3, the extending portion 35 connects the first base portion 31 and the second base portion 32 on the left side. The extending portion 35 includes a projecting portion 35a projecting inwardly (downwardly) of the fuel tank body 1. A hole portion 35b having a substantially trapezoidal cross-section is formed inside the projecting portion 35a. As shown in FIG. 5B, the extending portion 35 is integrated with a fifth projecting portion 151 projecting inwardly of the upper wall portion 1a. Since the extending portion 35 and the fifth projecting portion 151 are integrated together, the fifth projecting portion 151 has a shape along a shape of the extending portion 35. That is, the fifth projecting portion 151 includes a bottom portion 15a and a wall portion 15b along the shape of the extending portion 35. During molding described below, resin enters the hole portion 35b of the extending portion 35, so that the wall portion 15b is formed.

As shown in FIGS. 2, 3, the extending portion 34 connects the first base portion 31 and the second base portion 32 on the right side. The extending portion 34 includes a projecting portion 34a projecting inwardly (downwardly) of the fuel tank body 1. A hole portion 34b having a substantially rectangular cross-section is formed inside the projecting portion 34a. Two hole portions 34b are arranged side by side in an extending direction of the extending portion 34. Similarly to the extending portion 35 described above, the extending portion 34 is integrated with a fifth projecting portion 151 projecting inwardly of the upper wall portion 1a (see FIG. 5B). That is, the fifth projecting portion 151 includes a bottom portion 15a and a wall portion 15b along a shape of the extending portion 34. During molding described below, resin enters the hole portions 34b of the extending portion 34, so that the wall portion 15b is formed.

The extending portion 36 connects the second base portion 32 and the third base portion 33 respectively at the left side and the right side of the fuel tank body 1. The extending portion 36 has a flat plate shape.

As shown in FIG. 3, the extending portions 37 are respectively connected to the second base portion 32 on the left side and the second base portion 32 on the right side of the fuel tank body 1. The extending portion 37 includes a projecting portion 37a projecting inwardly (downwardly) of the fuel tank body 1. A hole portion 37b having a substantially rectangular cross-section is formed in the projecting portion 37a. The extending portion 37 is integrated with a projecting portion (not shown) projecting inwardly of the upper wall portion 1a. Similarly to the fifth projecting portion 151 described above, during molding, resin is fixed along a shape of the projecting portion 37a and enters the hole portion 37b, so that the projecting portion is formed.

The extending portions 38 are respectively connected to the second base portion 32 on the left side and the second base portion 32 on the right side of the fuel tank body 1. The extending portion 38 includes a plate-like projecting portion 38a connected to the second base portion 32 and a transverse plate portion 38b provided at a distal end portion of the projecting portion 38a. The transverse plate portion 38b is formed wider than a plate thickness of the projecting portion 38a. As shown in FIG. 1, the extending portions 38, 38 extend to positions corresponding to the cushioning members 38A, 38A. That is, the cushioning member 38A is disposed on the transverse plate portion 38b of the extending portion 38.

The reinforcing member 3B includes a first base portion 31, second base portions 32, 32, and extending portions 34, 35. The first base portion 31, the second base portions 32, 32, and the extending portions 34, 35 of the reinforcing member 3B are respectively formed substantially similarly to the portions of the reinforcing member 3A, and the reinforcing member 3B is disposed vertically symmetrical with the reinforcing member 3A.

In the reinforcing member 3B, the first base portion 31 has a substantially truncated cone shape reduced in diameter upward, and faces the first base portion 31 of the reinforcing member 3A. Similarly to the first base portion 31 of the reinforcing member 3A, the first base portion 31 of the reinforcing member 3B includes an extending portion 34 and an extending portion 35.

As shown in FIG. 4A, the first base portion 31 of the reinforcing member 3B is integrated with a second projecting portion 112 projecting inwardly of the lower wall portion 1b. Since the first base portion 31 and the second projecting portion 112 are integrated together, a peripheral wall portion 1b1 and a bottom portion 1b2 of the second projecting portion 112 have a shape along a shape of the first base portion 31. The bottom portion 1a2 of the first projecting portion 111 and the bottom portion 1b2 of the second projecting portion 112 abut each other to be fixed by welding.

As shown in FIG. 4B, the second base portions 32, 32 of the reinforcing member 3B are disposed at positions corresponding to the connecting member 2, 2. The second base portion 32 on the left side is connected to the first base portion 31 via the extending portion 35, and the second base portion 32 on the right side is connected to the first base portion 31 via the extending portion 34. Although the reinforcing member 3B does not have the above-described extending portions 36 to 38, these extending portions 36 to 38 may be provided in the second base portion 32.

The second base portion 32 of the reinforcing member 3B is integrated with a second projecting portion 122 projecting inwardly of the lower wall portion 1b. Since the second base portion 32 and the second projecting portion 122 are integrated together, a step portion 1b3 and a bottom portion 1b4 of the second projecting portion 122 have a concave shape along a shape of the second base portion 32. The lower end portion 2b of the connecting member 2 is welded to an upper surface (the inner wall surface 11b of the lower wall portion 1b) of the bottom portion 1b4 of the second projecting portion 122.

As shown in FIG. 5B, the extending portion 35 of the reinforcing member 3B is integrated with a fifth projecting portion 151 projecting inwardly of the lower wall portion 1b. A tip end (lower end) of the fifth projecting portion 151 on the upper wall portion 1a side and a tip end (upper end) of the fifth projecting portion 151 on the lower wall portion 1b side are welded together.

Similarly to the extending portion 35, the extending portion 34 of the reinforcing member 3B is integrated with the fifth projecting portion 151 projecting inwardly of the lower wall portion 1b. The tip end (lower end) of the fifth projecting portion 151 on the upper wall portion 1a side and the tip end (upper end) of the fifth projecting portion 151 on the lower wall portion 1b side are welded together. In this way, since the extending portions 34 and the extending portions 35 of the reinforcing members 3A, 3B vertically abut each other to be welded, the rigidity of the fuel tank body 1 can be further increased and a function of cancelling wave can be obtained.

Figure 6A:
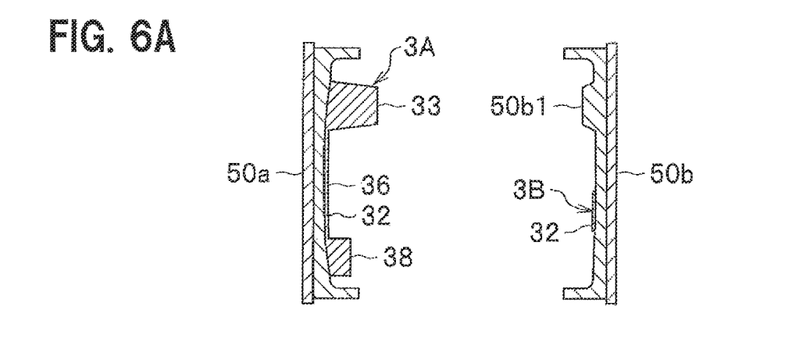
FIGS. 6A to 6D are explanatory views showing a method of assembling the connecting member and the reinforcing member.
Figure 6B:
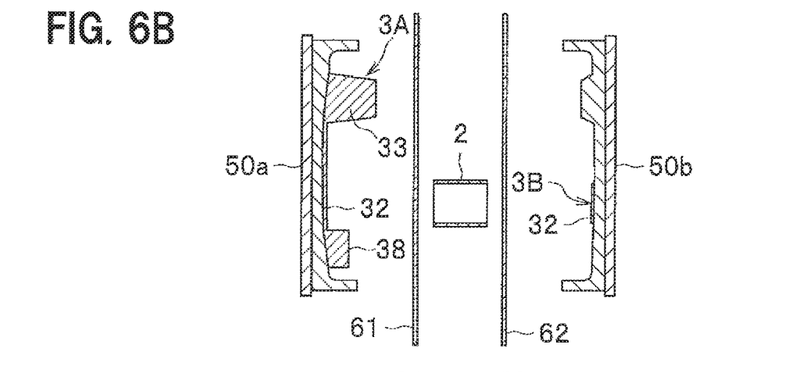
Figure 6C:
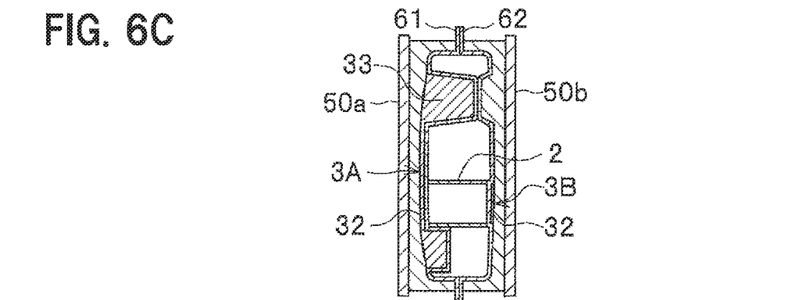
Figure 6D:
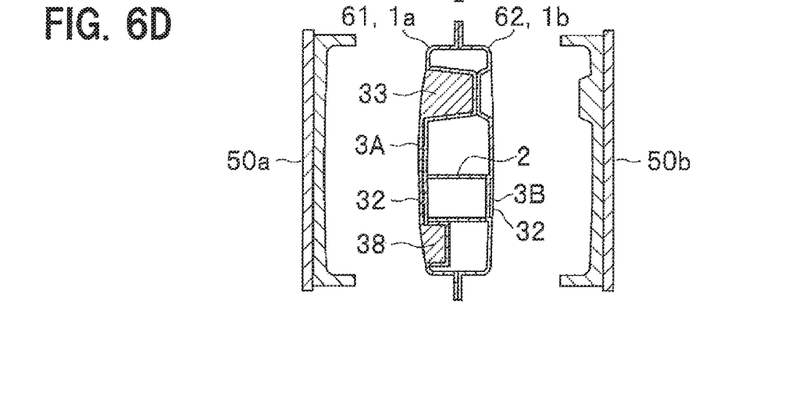

Next, a manufacturing procedure of the fuel tank T will be described with reference to FIGS. 6A to 6D. FIGS. 6A to 6D are schematic plan cross-sectional views showing a manufacturing procedure. FIG. 6A is a view showing a pair of molding dies 50a, 50b for manufacturing the fuel tank T, and corresponds to a state viewed from a direction of an arrow X shown in FIG. 2 (the reinforcing members 3A, 3B are shown in cross-section). FIG. 6B is a view showing a parison disposed between the molding dies, and FIG. 6C is a view showing a state in which the molding dies are mold-clamped. FIG. 6D is a view showing a state in which a molded article of the fuel tank is taken out from the molding dies.

A method of manufacturing the fuel tank T includes a preparation step, a parison placement step, a suction step, a connecting member attaching step, a blowing step, and a demolding step. As shown in FIG. 6A, the reinforcing member 3A is held by one molding die 50a and the reinforcing member 3B is held by the other molding die 50b. The molding dies 50a, 50b are combined together to form the fuel tank T. As shown in the drawings, a concave portion of the molding die 50a and a concave portion of the molding die 50b are arranged to face each other. The molding die 50b is provided with a projecting portion 50b1 for forming the fourth projecting portion 141.

The preparation step is a step of setting the reinforcing member 3A in the molding die 50a and setting the reinforcing member 3B in the molding die 50b. The molding die 50a has a holding means (not shown) for holding the reinforcing member 3A, and the molding die 50b has a holding means (not shown) for holding the reinforcing member 3B. A surface of the reinforcing member 3A makes surface contact with a molding surface of the molding die 50a. A surface of the reinforcing member 3B makes surface contact with a molding surface of the molding die 50b.

By setting the reinforcing members 3A, 3B via the holding means, it is possible to prevent displacement and tilting of the reinforcing members 3A, 3B during molding. The holding means may be configured such that magnets are provided in the molding dies 50a, 50b, or convex portions are provided in the molding dies 50a, 50b to be fitted into concave portions provided in the reinforcing members 3A, 3B.

The parison placement step is a step of placing a parison between the molding dies 50a, 50b. As shown in FIG. 6B, in the parison placement step, a parison 61 and a parison 62 are disposed between the molding dies 50a, 50b by using a chuck (not shown) or the like. The reinforcing member 3A is disposed outside one parison 61 and the reinforcing member 3B is disposed outside the other parison 62.

The suction step is a step of transferring the parisons 61, 62 to the molding dies 50a, 50b by suction. The connecting member attaching step is a step of attaching the connecting members 2, 2 to the parisons 61, 62 transferred to the molding dies 50a, 50b. In the connecting member attaching step, for example, the upper end portions of the connecting members 2, 2 are pushed into and attached to the parison 61 by using an attaching means such as a robot arm. A method of attaching the connecting member 2 is not particularly limited thereto, and for example, a center mold (not shown) may be placed between the molding dies 50a, 50b, and the connecting member 2 may be attached to the parison 61 (or the parison 62) by using the center mold.

In the blowing step, the molding dies 50a, 50b are moved in a facing direction and mold-clamped. Air is blown into the molding dies 50a, 50b by a blowing means (not shown), so that the parisons 61, 62 is completely transferred to the molding dies 50a, 50b. At this time, the parison 61 is transferred along an outer periphery of the reinforcing member 3A, and the parison 61 enters the hole portions 34b, 35b. The parison 62 is transferred along outer peripheries of the reinforcing member 3B and the projecting portion 50b1, and the parison 62 enters the hole portions 34b, 35b. Further, the connecting member 2 is welded to the parisons 61, 62.

The demolding step is a step of taking out transferred parisons 61, 62 from the molding dies 50a, 50b. As shown in FIG. 6D, in the demolding step, the molding dies 50a, 50b are opened to take out the molded article, and burrs projecting from upper and lower ends of the molded article are cut off. Then, as shown in FIG. 1, the pump mounting hole 1d is opened on an upper surface of the molded article, so that the fuel tank T is completed.

With the fuel tank T of the present embodiment described above, since the opposed inner wall surfaces 11a, 11b are connected by the connecting member 2, the rigidity of the fuel tank body 1 can be increased. The second base portions 32, 32 of the reinforcing members 3A, 3B are arranged outside the connecting member 2, and the extending portions 34, 35, 36, 37, 38 extending from the second base portions 32, 32 are also arranged outside the connecting member 2. Thus, it is possible to effectively reinforce a portion where stress is applied during positive pressure deformation or negative pressure deformation, thereby further increase the rigidity of the fuel tank body 1. Therefore, it is possible to suppress deformation of the fuel tank body 1 regardless of positive pressure deformation or negative pressure deformation of the fuel tank body 1.

Two connecting members 2 are arranged, and two pairs of second base portions 32 are arranged corresponding to the two connecting members 2. This makes it possible to increase the rigidity of the fuel tank body 1 as compared with a case where the connecting member 2 and the second base portion 32 are arranged one by one. Therefore, deformation of the fuel tank body 1 can be suppressed more effectively. In addition, for example, since the first base portion 31 and the second base portion 32 are connected via the extending portions 34, 35, deformation between the first base portion 31 and the second base portion 32 can be suitably suppressed by the extending portions 34, 35.

Since the second base portion 32 and the third base portion 33 are connected by the extending portion 36, deformation between the second base portion 32 and the third base portion 33 can be suitably suppressed by the extending portion 36. In this case, the first base portion 31 and the third base portion 33 may be connected by using an extending portion (not shown). Further, the third base portions 33 may be connected to each other by using an extending portion (not shown).

The extending portions 34, 35, 37, 38 respectively include projecting portions 34a, 35a, 37a, 38a. Thus, since the inner wall surfaces 11a, 11b of the fuel tank body 1 project inwardly, it is possible to obtain the function of cancelling wave of the fuel. Further, rigidity of the reinforcing members 3A, 3B themselves is also increased. Furthermore, by transferring the parisons 61, 62 along a shape of the reinforcing members 3A, 3B during molding, the reinforcing members 3A, 3B and the fuel tank body 1 can be firmly integrated together.

Since the extending portion 38 extends to a position corresponding to the cushioning member 38A, rigidity around the cushioning member 38A which is easily subjected to external forces can be increased. Therefore, deformation of the fuel tank body 1 can be suppressed more effectively. In addition, since the projecting portion 38a is disposed perpendicular to the transverse plate portion 38b, rigidity of the extending portion 38 can be increased.

Since the reinforcing members 3A, 3B are arranged in pairs on the opposed outer wall surfaces 12a, 12b of the fuel tank body 1, it is possible to increase the rigidity of the fuel tank body 1 in a well-balanced manner.

In the prior art, the fuel tank body may shake inside the frame member due to, for example, a molding error between the fuel tank body and the frame member. However, in the present embodiment, since the reinforcing members 3A, 3B are inserted from outside the fuel tank body 1, it is possible to firmly fix the fuel tank body 1 without shaking. Further, in the prior art, an assembling step of assembling the frame member to the fuel tank body is required in addition to a molding step of the fuel tank body. In contrast, in the present embodiment, the reinforcing members 3A, 3B can be inserted to the fuel tank body 1 during molding the fuel tank body 1, and thus a manufacturing cycle can be shortened. In addition, since the reinforcing members 3A, 3B can be inserted into the fuel tank body 1, the outer wall surfaces 12a, 12b of the fuel tank body 1 and outer surfaces of the reinforcing members 3A, 3B can be flush with each other.

In the present embodiment, as shown in FIG. 4A, the first base portion 31 of the reinforcing member 3A and the first base portion 31 of the reinforcing member 3B abut each other, and the first projecting portions 111, 112 are welded together, so that an abutment portion 115 is formed. That is, the inner wall surfaces 11a, 11b of the fuel tank body 1 can be connected to each other by the first projecting portion 111 and the second projecting portion 112. Thus, it is possible to further increase the rigidity of the fuel tank body 1 and to obtain the function of cancelling wave.

In the present embodiment, as shown in FIG. 5A, an abutment portion 115 is formed by welding the third projecting portion 131 and the fourth projecting portion 141 by the third base portion 33 of the reinforcing member 3A. That is, the inner wall surfaces 11a, 11b of the fuel tank body 1 can be connected to each other by the third projecting portion 131 and the fourth projecting portion 141. Thus, it is possible to further increase the rigidity of the fuel tank body 1 and to obtain the function of cancelling wave. In addition, the reinforcing member 3 has the first base portion 31 and the third base portion 33 disposed at positions corresponding to the abutment portions 115, and the extending portions 34 to 36 extending along the outer wall surfaces 12a, 12b from the first base portion 31 and the third base portion 33, and thus the rigidity of the fuel tank body 1 can be further increased similarly to the second base portion 32 described above. Therefore, it is possible to suppress deformation of the fuel tank body 1 regardless of positive pressure deformation or negative pressure deformation of the fuel tank body 1. In the present embodiment, both of the connecting member 2 and the abutment portion 115 are provided, but at least one of them may be provided.

Although the embodiments of the present invention have been described above, the present invention is not limited to the above-described embodiments, and for example, various modifications can be made as follows. For example, in the above-described embodiment, although the first base portion 31, the second base portion 32 and the third base portion 33 are all connected by the extending portions 35, 34 and the like, the present invention is not limited thereto, but only a part of them may be connected to each other, or they may not be connected at all.

Although the first base portion 31 and the third base portion 33 have a substantially truncated cone shape and the second base portion 32 has a circular flat plate shape, the present invention is not limited thereto, but they may have various shapes.

Although the reinforcing member 3 includes the pair of reinforcing members 3A and 3B, the present invention is not limited thereto, but the reinforcing member 3 may include only one of them. The pair of reinforcing members 3A and 3B may be vertically symmetrical (an upper half and a lower half thereof may have the same shape).

REFERENCE SIGNS LIST

1: fuel tank body
2: connecting member
3: reinforcing member
3A, 3B: reinforcing member
11a, 11b: inner wall surface
12a, 12b: outer wall surface
31: first base portion
32: second base portion
33: third base portion
34 to 38: extending portion
34a, 35a: projecting portion
37a: projecting portion
38a: projecting portion
38A: cushioning member
T: fuel tank

The invention claimed is:
1. A fuel tank comprising:
a resin fuel tank body having a first and a second wall facing each other; and at least one reinforcing member integrated with the resin fuel tank body by insert molding from outside the resin fuel tank body and reinforcing the resin fuel tank body,
wherein
the fuel tank further comprises at least one connecting member disposed inside the resin fuel tank body and connecting the first and second walls by welding one end of the connecting member to the first wall and the other end to the second wall, and/or
the first wall comprises at least one first projecting portion and the second wall comprises at least one second projecting portion, the at least one first projecting portion projecting toward the second wall, the at least one second projecting portion projecting to the at least one first projecting portion to abut against the at least one first projecting portion in the resin fuel tank body and form at least one abutment portion, and that the at least one reinforcing member comprises: at least one base portion disposed on an outer wall surface of the resin fuel tank body and at a position where the at least one connecting member and/or the at least one abutment portion is located; and an extending portion extending along the outer wall surface from the at least one base portion.

2. The fuel tank according to claim 1, wherein
the at least one connecting member and/or the at least one abutment portion are arranged in plurality,
the at least one base portion are arranged in plurality, and
at least two of the at least one base portion are connected to each other via the extending portion.

3. The fuel tank according to claim 1, wherein the extending portion includes a projecting portion projecting toward an inside of the resin fuel tank body.

4. The fuel tank according to claim 3, wherein the projecting portion includes a concave portion or a hole portion.

5. The fuel tank according to claim 1, wherein
the resin fuel tank body is provided with a cushioning member on the outer wall surface of the resin fuel tank body, and
the extending portion extends to a position where the cushioning member is located.

6. The fuel tank according to claim 1, wherein the at least one reinforcing member are arranged in a pair on a first and a second outer wall surfaces of the first and the second walls of the resin fuel tank body.

7. The fuel tank according to claim 2, wherein the extending portion includes a projecting portion projecting toward an inside of the resin fuel tank body.

* * * * *